United States Patent Office 3,547,942
Patented Dec. 15, 1970

3,547,942
IMIDAZOLE CARBOXYLATES
Erik Fred Godefroi, Turnhout, and Cyriel Alfons Maria Van Der Eijcken, Vosselaar, near Turnhout, Belgium, assignors to Janssen Pharmaceutica, N.V., a corporation of Belgium
No Drawing. Original application Apr. 14, 1966, Ser. No. 542,465, now Patent No. 3,485,917, dated Dec. 23, 1969. Divided and this application Jan. 15, 1969, Ser. No. 823,200
Int. Cl. C07d 49/36
U.S. Cl. 260—309
3 Claims

ABSTRACT OF THE DISCLOSURE 1-(1,2,3,4-tetrahydro-1-naphthyl)- and 1-(1-indanyl)-imidazole carboxylates, useful as fungicides.

This is a divisional application of my copending application Ser. No. 542,465, filed Apr. 14, 1966, now U.S. Pat. 3,485,917.

This invention relates to novel organic compounds and, more particularly, to certain imidazole carboxylates having the formula:

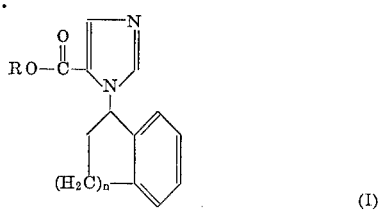
(I)

wherein R is a member selected from the group consisting of lower alkyl; allyl; lower alkoxy-lower alkyl; di-(lower alkyl)-amino-lower alkyl; aralkyl, preferably benzyl; cycloalkyl such as cyclohexyl and cyclopentyl; and tetrahydrofuryl-methyl; and $n$ is a whole integer from 1 to 2. The invention is also concerned with the therapeutically active acid addition salts of the foregoing.

As used herein, lower alkyl and lower alkoxy have from 1 to 7 carbon atoms, including straight or branched saturated aliphatic chains, such as, for example, methyl, ethyl, propyl, isopropyl, butyl, secondary-butyl, pentyl, hexyl, heptyl and the like alkyl groups, and the respective methoxy, ethoxy, propoxy, isopropoxy, butoxy, and the like alkoxy groups.

The subject compounds are useful fungicides as demonstrated by their fungicidal action against such dermatophytes as *Microsporum canis*, *Ctenomyces mentagrophites* and *Trichophyton ruburm* and such other fungi as *Aspergilus fumigatus*.

The compounds of this invention, wherein R is lower alkyl, may be prepared by the oxidation of 2-mercapto-5-imidazolecarboxylic acid esters (II) with nitric acid according to the procedure for synthesizing 5-imidazole carboxylates outlined by R. G. Jones in J. Am. Chem. Soc., 71, 644 (1949). In the presence of a small amount of alkali nitrite, e.g., sodium nitrite, to initiate the reaction, the nitric acid oxidation may be advantageously conducted at temperatures of 25–35° C. The resulting desulphurization may be illustrated as follows:

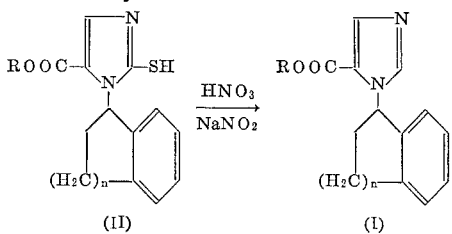

The foregoing 2-mercapto-5-imidazole carboxylic acid esters (II) may be obtained according to methods described in J. Am. Chem. Soc., 71, 644 (1949) and U.S. Pat. No. 2,541,924. In general, said esters are prepared by condensation of an appropriate N-acyl-C-formyl glycine ester enol (III) with hydrogen thiocyanate in an aqueous solution using approximately equivalent molecular quantities of the reactants. Alternatively, condensation may be accomplished with water-soluble metal salts, preferably the alkali metal salts such as sodium, potassium, etc., of one or both of the reactants, such as (IV) below, in which case the reaction is carried out in the presence of a strong, nonoxidizing mineral acid such as hydrochloric acid, hydrobromic acid, phosphoric acid and the like to produce the acid form of the reactants. The condensation solvent is preferably an aqueous solvent such as water or aqueous alcohol containing sufficient water to retain in solution any inorganic salt which may be produced during the reaction. Room temperatures (circa 20–25° C.) are advantageously employed. The condensation reactions may be illustrated by the following equations, wherein the symbol (A) represents the substituent:

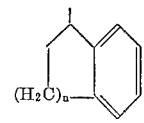

and the acyl group (COR′) is a lower aliphatic such as formyl, acetyl, propionyl and the like:

(III)  (A)—N—C—COOR        (A)—N—C—COOR   (IV)
            ‖                      ‖
            CHOH                   CHONa
            |                      |
            COR′                   COR′

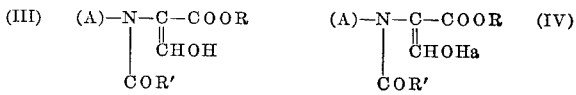

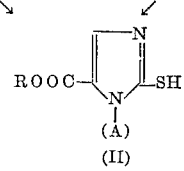
(II)

A general outline for preparing the alkali metal enolate salt of N-acyl-C-formylglycine esters (IV) is illustrated as follows. A primary amine bearing the substituent (A), as heretofore defined, is reacted with a lower alkyl ester of chloroacetic acid, e.g., ethyl chloroacetate, in an inert organic solvent, such as benzene, toluene, dimethylformamide, etc., in the presence of a halogen acid acceptor to bind the halogen acid that is liberated during the course of the reaction. Typical halogen acid acceptors include sodium carbonate; organic tertiary amines such as the trialkylamines, e.g., triethylamine, tributylamine, etc.; heterocyclic amines, e.g., N-alkyl piperidine, pyridine, etc.; and dialkyl aromatic amines, e.g., diethyl aniline, dimethylaniline, etc. The resulting N-(A)-substituted glycine lower alkyl ester is then acylated in the conventional manner, for example with formic acid to produce the corresponding N-CHO-N-(A)-substituted glycine ester, or with a lower aliphatic acylating agent such as acetic anhydride, acetyl chloride, propionic anhydride, etc., to produce the corresponding N-acyl-N-(A)-substituted glycine esters. The N-acylated glycine esters may then be C-formylated using a lower alkyl ester of formic acid, e.g., methyl formate, with an alkali alkoxide, e.g., sodium methoxide, in an inert organic solvent such as benzene, tetrahydrofuran, etc., according to the Claisen method [Ann., 337, 236 (1904)]. To avoid transesterification, glycine esters and formic acid esters derived from the same esterifying lower aliphatic alcohol are preferably used. The resulting alkali metal enolate salt (IV) can be isolated by adding several volumes of ether and filtering off the solid salt. Alternatively, the alkali metal enolate salt need not be isolated but may be extracted with water and the aqueous solution employed as such thereafter. The free N-acyl-C-formyl glycine ester enol (III) can be obtained by acidifying an aqueous solution of the corresponding salt. Isolation of the free enol is effected with a water-immiscible solvent such as chloroform.

The 1-(A)-5-imidazole carboxylates of this invention, wherein (A) is as heretofore defined and R is lower alkyl, allyl, lower alkoxy-lower alkyl, di-(lower alkyl)-amino-lower alkyl, benzyl, cycloalkyl or tetrahydrofuryl-methyl, may be prepared from the corresponding 1-(A)-substituted lower alkyl imidazole carboxylates. The latter esters are hydrolyzed, preferably with a strong alkali such as sodium or potassium hydroxide, to yield the corresponding imidazole carboxylic acids. Conversion of the acid to the corresponding imidazole carboxylic acid halide is suitably effected by treatment with a sulfur or phosphorous oxyhalide as, for example, phosphorousoxychloride or, preferably, thionyl chloride. Due to the hydrogen halide liberated during the course of the reaction, the 1-(A)-5-imidazole carboxylic acid halide is obtained as the hydrohalide salt. The salt may advantageously be used as such without conversion to the base form in the subsequent reaction step, in which case, the final product is also obtained in salt form. The resulting imidazole carboxylic acid halide is then reacted with the appropriate alcohol, e.g., lower alkanol, allyl alcohol, lower alkoxy-lower alkanol, di-(lower alkyl)-amino-lower alkanol, benzyl alcohol, cycloalkanol or tetrahydrofuryl-methanol, preferably under reflux conditions, to yield the corresponding lower alkyl, allyl, lower alkoxy-lower alkyl, di-(lower alkyl)-amino-lower alkyl, benzyl, cycloalkyl and tetrahydrofuryl-methyl esters, respectively, of 1-(A)-5-imidazole carboxylic acid.

Depending upon the conditions employed during the course of the reactions, the novel compounds of this invention are obtained either in the form of the free bases or salts thereof. The salts are converted to the free bases in the usual manner, e.g., by reaction with alkali such as sodium or potassium hydroxide. The compounds in base form may be converted to their therapeutically useful acid addition salts by reaction with an appropriate acid, as, for example, an inorganic acid such as a hydrohalic acid, i.e., hydrochloric, hydrobromic or hydriodic acid; sulfuric, nitric or thiocyanic acid; a phosphoric acid; an organic acid such as acetic, propionic, glycolic, lactic, pyruvic, oxalic, malonic, succinic, maleic, fumaric, malic, tartaric, citric, benzoic, cinnamic, mandelic, methanesulfonic, ethanesulfonic, hydroxyethanesulfonic, p-toluenesulfonic, salicylic, p-aminosalicylic, 2-phenoxybenzoic or 2-acetoxy benzoic acid.

This invention provides valuable fungicidal compositions comprising the subject imidazole carboxylates (I) or the acid addition salts thereof as the active ingredient in a solvent or a solid, semisolid or liquid diluent or carrier. The subject compounds can be used in suitable solvents or diluents, in the form of emulsions, suspensions, or dispersions, on suitable solid or semisolid carrier substances, in ordinary or synthetic soaps, detergents or dispersion media, if desired, together with other compounds having arachnicidal, insecticidal, ovicidal, fungicidal and/or bactericidal effects, or together with inactive additives.

Solid carrier substances which are suitable for the preparation of compositions in powder form include various inert, porous and pulverous distributing agents of inorganic or organic nature, such as, for example, tricalcium phosphate, calcium carbonate, in the form of prepared chalk or ground limestone, kaolin, bole, bentonite, talcum, kieselguhr and boric acid; powdered cork, sawdust, and other fine pulverous materials of vegetable origin are also suitable carrier substances.

The active fungicidal ingredient is mixed with these carrier substances, for example, by being ground therewith; alternatively, the inert carrier substance is impregnated with a solution of the active component in a readily volatile solvent and the solvent is thereafter eliminated by heating or by filtering with suction at reduced pressure. By adding wetting and/or dispersing agents, such as pulverous preparations can also be made readily wettable with water, so that suspensions are obtained.

Inert solvents used for the production of liquid preparations should preferably not be readily inflammable and should be as far as possible odorless and as far as possible nontoxic to warm-blooded animals or plants in the relevant surroundings. Solvents suitable for this purpose are high-boiling oils, for example, of vegetable origin, and lower-boiling solvents with a flash point of at least 30° C., such as, for example, isopropanol, dimethylsulfoxide, hydrogenated naphthalenes and alkylated naphthalenes. It is, of course, also possible to use mixtures of solvents. Solutions can be prepared in the usual way, if necessary, with assistance of solution promoters. Other liquid forms which can be used consist of emulsions or suspensions of the subject compound in water or suitable inert solvents, or also concentrates for preparing such emulsions, which can be directly adjusted to the required concentration. For this purpose, the active ingredient is, for example, mixed with a dispersing or emulsifying agent. The active component can also be dissolved or dispersed in a suitable inert solvent and mixed simultaneously or subsequently with a dispersing or emulsifying agent.

It is also possible to use semi-solid carrier substances of a cream ointment, paste or waxlike nature, into which the active component can be incorporated, if necessary, with the aid of solution promoters and/or emulsifiers. Vaseline and other cream bases are examples of semisolid carrier substances.

Furthermore, it is possible for the active component be be used in the form of aerosols. For this purpose, the active component is dissolved or dispersed, if necessary, with the aid of suitable inert solvents as carrier liquids, such as difluorodichloromethane, which at atmospheric pressure boils at a temperature lower than room temperature, or in other volatile solvents. In this way, solutions under pressure are obtained which, when sprayed, yield aerosols which are particularly suitable for controlling fungi, e.g., in closed chambers and storage rooms, and for application to vegetation for eradicating or for preventing an infection by fungi.

The subject compounds and fungicidal compositions thereof can be applied by conventional methods. For example, a fungus growth or a material to be treated or to be protected against attack by fungus can be treated with the subject compounds and the fungicidal compositions thereof by dusting, sprinkling, spraying, brushing, dipping, smearing, impregnating or other suitable means.

When the subject compounds are employed in combination with suitable carriers, e.g., in solution, suspension, dust, powder, emulsion, and the like forms, a high activity over a very high range of dilution is observed. For example, concentration of the active ingredient ranging from 0.25–5.0 percent by weight, based on the weight of composition employed, have been found effective in combatting fungi. Of course, higher concentrations may also be employed as warranted by the particular situation.

The following examples are intended to illustrate, but not to limit, the scope of the present invention. Unless otherwise stated, all parts are by weight.

EXAMPLE I

A solution of 194 parts 1,2,3,4-tetrahydro-1-naphthylamine, 133.3 parts triethylamine in 200 parts dimethylformamide is cooled to 5° C. At this temperature 161.7 parts ethyl chloroacetate are added while stirring. The temperature rises slowly to 20° C. The mixture is then stirred overnight at room temperature. Then 350 parts anhydrous ether are added. Triethylammoniumchloride is precipitated. This is filtered off and after washing with ether, the filtercake is discarded. The filtrate is washed several times with water. The organic layer is then separated and dried over magnesium sulfate, filtered and evaporated, leaving an oily residue. This residue is dissolved in 450 parts xylene and 59.8 parts formic acid are added. The whole is then refluxed and the formed water is removed by azeotropic distillation via a water separator. After no more water is separated, the stirring and heating is continued for another 3 hours. After cooling, the reaction mixture is washed successively with water, sodium bicarbonate solution and again with water. The organic layer is separated, dried over magnesium sulfate, filtered and evaporated. The residual oil is distilled in vacuo to yield dl-(N-ethoxy-carbonyl-methyl-N-formyl) - 1,2,3,4-tetrahydro-1-naphthylamine; B.P. 195–202° C. at 2 mm. pressure.

40.89 parts of a 50% sodium suspension in benzene is added to 360 parts dry tetrahydrofuran. The mixture is stirred and heated to about 40° C. Then a solution of 28.16 parts anhydrous methanol in 45 parts tetrahydrofuran is added slowly while maintaining the same temperature. After the addition is complete, stirring is continued for a short time, whereupon the whole is cooled to about 5° C. At this temperature, 227 parts dl-(N-ethoxy-carbonyl - methyl - N - formyl) - 1,2,3,4-tetrahydro-1-naphthylamine and 156.6 parts methyl formate are added and the whole is stirred overnight at room temperature. The reaction mixture is then evaporated in vacuo and the residual solid is treated with 700 parts ether and 1000 parts water. The layers are separated. The aqueous solution is filtered, whereupon 162.6 parts concentrated hydrochloric acid are added, followed immediately by a solution of 127.89 parts potassium the thiocyanate in 130 parts water. The whole is stirred for 5 hours at 40° C. and then for several days at room temperature. The precipitated solid is filtered off and triturated in diluted methanol (about 65%), filtered and dried to yield dl-1-1,2,3,4 - tetrahydro - 1 - naphthyl) - 2 - mercepto - 5 - (methoxy-carbonyl)-imidazole. A sample is recrystallized by dissolving it in a small volume of hot methanol, which is then treated with activated charcoal, after which water is added until precipitation set in. On cooling, a solid is obtained which is filtered off and dried to yield dl-1-(1,2,3,4 - tetrahydro - 1 - naphthyl) - 2 - mercapto-5-methoxy-carbonyl)-imidazole; M.P. 149–150° C.

To a mixture of 150 parts of nitric acid (d: 1.4), 1 part of sodium nitrite and 320 parts of water are added portionwise 81 parts of 1-(1,2,3,4-tetrahydro-naphthyl)-2-mercapto-5-(methoxy-carbonyl)-imidazole, while keeping the temperature below 30° C. After the addition is complete, the whole is stirred for one hour at room temperature. The solvent is evaporated and the solid residue is washed with water and dried in vacuo, yielding 1-(1,2,3,4-tetrahydro - 1 - naphthyl)-5-methoxy-carbonyl-imidazole nitrate; M.P. 149–151.5° C. (dec.).

EXAMPLE II

To a solution of 80 parts of sodium hydroxide in 200 parts of water is added with stirring 58 parts of 1-(1,2,3,4-tetrahydro-naphthyl) - 5 - methoxy-carbonyl-imidazole nitrate. The mixture is stirred and refluxed for one hour. The mixture is diluted with 300 parts of water and then there is added 109 parts of acetic acid. Cooling and seeding gives a crude product which is recrystallized from a mixture of water and dimethylformamide, yielding 1-(1,2,3,4-tetrahydro-naphthyl) - 5 - carboxyl-imidazole; M.P. 206.5–210° C.

A mixture of 7.5 parts of 1-(1,2,3,4-tetrahydro-naphthyl)-5-carboxy-imidazole in 64 parts of thionylchloride is stirred and refluxed for one hour. Excess thionylchloride is evaporated off and 64 parts of ethanol is added. The mixture is stirred and refluxed for another hour. The solvent is evaporated and to the residue are added 75 parts of water. The resulting aqueous solution is alkalized with sodium hydroxide, and extracted with ether. The extract is dried and addition of 4.2 parts of nitric acid gives the nitrate salt, which is filtered off and recrystallized from a mixture of ethanol and 2-propanol, yielding 1-(1,2,3,4 - tetrahydro-naphthyl) - 5-(ethoxy-carbonyl)-imidazole nitrate; M.P. 135–136° C.

EXAMPLE III

A reaction vessel is charged with 800 parts of xylene previously dried over sodium. Then there is added successively 560 parts of absolute ethanol and 53 parts of sodium. The excess of ethanol is distilled off. To the residue is added a second portion of 400 parts of xylene and the solvent is further distilled off until an internal temperature of 140° C. is reached. The mixture is cooled in an ice-bath to below 20° C. Then there is added 481 parts of ethyl formate (slightly exothermic reaction), followed by the addition of 566 parts of (N-ethoxy-carbonyl-methyl-N-formyl) - 1,2,3,4-tetrahydro-1-naphthylamine over a period of about 30 minutes. After the addition is complete, the whole is stirred overnight at room temperature. The reaction mixture is divided between 300 parts of water and 400 parts of diisopropylether. The organic phase is separated, extracted once more with 100 parts of water. The combined aqueous phases are washed with diisopropylether (2×400 and 2×200 parts). The aqueous extract is acidified, after cooling in an ice-bath, with concentrated hydrochloric acid, whereupon an oil is separated, which solidifies on stirring. The solid product is suction-filtered off, washed on the filter successively with water and small quantities of 2-propanol and dried in vacuo, yielding N-formyl-N-(1,2,3,4-tetrahydro-1-naphthyl) - 2 - (ethoxy-carbonyl)-aminoacetaldehyde; M.P. 140.5–142.5° C.

A mixture of 4 parts of N-formyl-N-(1,2,3,4-tetrahydro-1-naphthyl) - 2 - (ethoxy-carbonyl)-aminoacetaldehyde, 15 parts of potassium thiocyanate in 25 parts of water, 12.6 parts of concentrated hydrochloric acid, 100 parts of water and 200 parts of denatured ethanol is stirred for 5 hours at 45° C. The heating-source is removed and the reaction mixture is stirred for one hour longer. The homogeneous mass is stirred for 2 days at room temperature and on scratching the product is crystallized. It is filtered off, washed with water and dried in vacuo, yielding 1-(1,2,3,4 - tetrahydro-1-naphthyl)-2-mercapto-5 - (ethoxy-carbonyl)-imidazole; M.P. 155.5–157° C.

To a mixture of 3.5 parts of sodium nitrite, 480 parts of nitric acid (conc.: d=1.4), and 1000 parts of water is added portionwise 270 parts of 1-(1,2,3,4-tetrahydro-1-naphthyl)-2-mercapto - 5 - (ethoxy-carbonyl)-imidazole (exothermic reaction). During the addition the temperature is kept below 35° C. (water-bath). After the addition is complete, the whole is stirred for one hour, whereafter the product is precipitated. It is filtered off and dried in vacuo, yielding crude 1-(1,2,3,4-tetrahydro-naphthyl)-5-(ethoxy-carbonyl)-imidazole nitrate. This crop is purified as follows: it is recrystallized from 240 parts of denatured ethanol and boiled with 8 parts of activated charcoal. The charcoal is filtered over hyflo, washed with about 80 parts of boiling ethanol and the hot filtrate is allowed to come to room temperature. The product is filtered off, washed once more with ethanol and dried in vacuo, yielding 1-(1,2,3,4 - tetrahydro-naphthyl)-5-(ethoxy-carbonyl)-imidazole nitrate: M.P. 136–137.8° C.

EXAMPLE IV

A mixture of 216 parts nitric acid, 400 parts water and 1.5 parts sodium nitrite is heated to about 25° C. While maintaining this temperature, there is added portionwise to this stirred mixture 112 parts dl-1-(1,2,3,4 - tetrahydro-1-naphthyl)-2-mercapto - 5 - (methoxy-carbonyl)-imidazole. After the addition is complete and as no more fumes of nitrogen oxide are evolved, the whole is cooled in an ice-bath, whereupon the salt (nitrate) is precipitated. This product is filtered off and transferred into a saturated sodium carbonate solution. The whole is stirred and boiled for 5 minutes. The free base is extracted with ether. The obtained solution is dried over magnesium sulfate, filtered and the solvent evaporated in vacuo. Twenty parts of the resulting crude base is dissolved in methanol and to this solution is added an excess of oxalic acid anhydrate in the same solvent. The resulting solution is heated to reflux whereupon diethylether is added until precipitation occurs. After cooling, the precipitated solid is filtered off to yield crude dl-1-(1,2,3,4 - tetrahydro-1-naphthyl)-5-(methoxy-carbonyl)-imidazole oxalate. This is recrystallized from 100 parts boiling 4 - methyl-2-pentanone to yield dl-1-(1,2,3,4 - tetrahydro-1-naphthyl)-5 - (methoxy-carbonyl)-imidazole oxalate; M.P. 136–138.5° C.

EXAMPLE V

A mixture of 7.5 parts of 1 - (1,2,3,4-tetrahydro-1-naphthyl)-5-carboxy-imidazole and 55 parts of thionylchloride is stirred and refluxed for one hour. The excess thionylchloride is evaporated off. To the residue is added 64 parts of n-propyl alcohol and the mixture is stirred and refluxed for another hour. The excess n-propyl alcohol is evaporated and the residue is taken up in water. The aqueous solution is alkalized with ammonium hydroxide and extracted with ether. The ether is dried and there is added nitric acid (d=1.4). The precipitated salt is filtered off and recrystallized from a mixture of 8 parts of propanol and 24 parts of diisopropylether, yielding 1-(1,2,3,4 - tetrahydro-1-naphthyl)-5-(propoxy-carbonyl)-imidazole nitrate; M.P. 109–110° C.

EXAMPLE VI

A mixture of 7.5 parts of 1-(1,2,3,4-tetrahydro-1-naphthyl) - 5 - carboxy-imidazole and 55 parts of thionylchloride is stirred and refluxed for one hour. The excess thionylchloride is taken off. To the residue is added 64 parts of 2-propyl alcohol and the mixture is stirred and refluxed for another hour. The solvent is evaporated and the residue is taken up in water. The aqueous phase is basified with ammonium hydroxide and the product is extracted with ether. The ether extract is dried and there is added nitric acid (d=1.4). The precipitated salt is filtered off and recrystallized from a mixture of 8 parts of 2-propanol and 24 parts of diisopropylether, yielding 1-(1,2,3,4 - tetrahydro-1-naphthyl) - 5 - (2-propoxy-carbonyl)-imidazole nitrate; M.P. 138–140° C.

EXAMPLE VII

A mixture of 6.8 parts of 1-(1,2,3,4-tetrahydro-1-naphthyl)-5-carboxy-imidazole, and 55 parts of thionylchloride is stirred and refluxed for one hour. The excess thionylchloride is taken off. To the residue is added 56 parts of allyl alcohol and the mixture is stirred and refluxed for another hour. The solvent is evaporated, and the residue is taken up in water. The aqueous phase is basified with ammonium hydroxide and extracted with ether. The ether extract is dried and there is added nitric acid (d=1.4). The precipitated salt is filtered off and recrystallized from a mixture of 8 parts of 2-propanol and 24 parts of diisopropylether, yielding 1-(1,2,3,4-tetrahydro-1-naphthyl)-5-(allyloxy-carbonyl)-imidazole nitrate; M.P. 103–104° C.

EXAMPLE VIII

A mixture of 7.5 parts of 1-(1,2,3,4-tetrahydro-1-naphthyl)-5-carboxy-imidazole and 80 parts of thionylchloride is stirred and refluxed for 1 hr. 30 mins. The exceed of thionylchloride is evaporated off and to the residue is added 40 parts of n-butanol while cooling in ice. After the addition is complete, the whole is stirred and refluxed for 20 minutes. The excess n-butanol is evaporated off and to the residue is added 50 parts of water. This aqueous phase is alkalized with sodium hydroxide solution 2 N until pH 9. The product is extracted with dry either and to the ether extract is added 3 parts of nitric acid. The precipitated product is filtered off and recrystallized from a mixture of 2-proanol and diisopropylether, yielding 1-(1,2,3,4-tetrahydro-1-naphthyl)-5 - (butoxy - carbonyl)-imidazole nitrate; M.P. 126–127° C.

EXAMPLE IX

A mixture of 7.5 parts of 1-(1,2,3,4-tetrahydro-1-naphthyl)-5-carboxy-imidazole and 80 parts of thionylchloride is stirred and refluxed for 1 hr. 30 mins. The excess thionylchloride is evaporated off. To the cooled residue is added 50 parts of 2-methoxy-ethanol and the whole is stirred and refluxed for 20 minutes. The excess 2-methoxy-ethanol is evaporated off and to the residue is added 50 parts of water. This aqueous phase is alkalized with sodium hydroxide solution 2 N until pH 9. The product is extracted with ether and to the ether extract is added 3 parts of nitric acid. The precipitated product is filtered off and recrystallized from a mixture of 2-propanol and diisopropyl ether, yielding 1-(1,2,3,4-tetrahydro-1-naphthyl)-5-[(2-methoxyethoxy)-carbonyl)]-imidazole nitrate; M.P. 115–117° C.

EXAMPLE X

A mixture of 7.5 parts of 1-(1,2,3,4-tetrahydro-1-naphthyl)-5-carboxy-imidazole and 80 parts of thionylchloride is stirred and refluxed for 1 hr. 30 mins. The excess thionylchloride is then evaporated in vacuo. To the cooled residue is added 40 parts of 1-pentanol and the whole is stirred and refluxed for 20 minutes. After cooling, the excess 1-pentanol is evaporated off. To the residue is added 50 parts of water. This aqueous solution is alkalized to pH 9 and the product is extracted with ether (three times). The combined extracts are extracted three times with hydrochloric acid solution 3 N, alkalized again and extracted with ether. The ethereal phase is dried and then there is added 3 parts of nitric acid 65%, whereupon the solid product is precipitated. It is filtered off and recrystallized from a mixture of 2-propanol and diisopropyl ether, yielding 1-(1,2,3,4-tetrahydro-1-naphthyl)-5-(pentyloxy - carbonyl)-imidazole nitrate; M.P. 102–103.5° C.

EXAMPLE XI

A mixture of 7.5 parts of 1-(1,2,3,4-tetrahydro-1-naphthyl)-5-carboxyl-imadazole and 80 parts of thionylchloride is stirred and refluxed for 1 hr. 30 mins. The excess thionylchloride is evaporated off and to the cooled residue is added 50 parts of tetrahydro-2-furylmethanol (exothermic reaction): the temperature is kept for one hour below 50° C. The reaction mixture is poured on water. The whole is alkalized to pH 9 and the product is extracted thoroughly with ether. The extract is dried and then there is added 3 parts of nitric acid 65%, whereupon the product is precipitated. It is filtered off and recrystallized from a mixture of acetone and diisopropyl ether, yielding 1-(1,2,3,4-tetrahydro-1-naphthyl) - 5 - (2-tetrahydrofuryl-methoxycarbonyl)-imidazole nitrate; M.P. 107–113.5° C.

EXAMPLE XII

A mixture of 7.5 parts of 1-(1,2,3,4-tetrahydro-1-naphthyl)-5-carboxyl-imidazole and 80 parts of thionylchloride is stirred and refluxed for 1 hr. 30 mins. The excess thionylchloride is taken off. The residue is cooled on ice whereupon there is added 45 parts of N,N-dimethyl-2-hydroxyethylamine (exothermic reaction). After standing overnight the reaction mixture is poured onto water. The aqueous phase is alkalized until pH 10 and the free base in extracted with ether (three times). The extracts are washed with water, dried and there is added 6 parts of nitric acid (d=1.34), whereupon the product is precipitated. It is filtered off and recrystallized from a mixture of ethanol andd iisopropylether, yielding 1-(1,2,3,4-tetrahydro-1-naphthyl)-5-(1-dimethyl-amino-ethoxy - carbonyl) - imidazole dinitrate; M.P. 113–136° C.

EXAMPLE XIII

A mixture of 7.5 parts of 1-(1,2,3,4-tetrahydro-1-naphthyl)-5-carboxyl-imidazole and 80 parts of thionylchloride is stirred and refluxed for 1 hr. 30 mins. The excess thionylchloride is removed and to the cooled residue are added 25 parts of benzyl alcohol (exothermic reaction). The mixture is warmed to 80° C. and then allowed to come to room temperature overnight. The reaction mixture is poured onto water. The aqueous phase is alkalized to pH 10 and the product is extracted three times with ether and three times with hydrochloric acid 3 N. The aqueous phase is alkalized again to pH 10 and the product is extracted with ether. The ethereal layer is dried and there is added 3 parts of nitric acid, whereupon the product is precipitated. It is filtered off and recrystallized from a mixture of 2-propanol and diisopropylether, yielding 1-(1,2,3,4-tetrahydro-1-naphthyl)-5-(benzyloxy - carbonyl) - imidazole nitrate; M.P. 133.5–134.5° C.

EXAMPLE XIV

A mixture of 7.5 parts of 1 - (1,2,3,4 - tetrahydro-1-naphthyl)-5-carboxy-imidazole and 80 parts of thionylchloride is stirred and refluxed for 1 hr. 30 mins. The excess thionylchloride is removed. The residue is cooled on ice and there is added 40 parts of isobutyl alcohol. The mixture is stirred and refluxed for one hour. The excess isobutyl alcohol is evaporated off and the residue is poured onto water. The aqueous phase is alkalized to pH 9 and extracted with ether. The ether is dried and there is added 3 parts of nitric acid, whereupon the product is precipitated. It is filtered off and recrystallized from a mixture of 2-propanol and diisopropylether, yielding 1-(1,2,3,4-tetrahydro - 1 - naphthyl) - 5 - (isobutoxy-carbonyl)-imidazole nitrate; M.P. 139–140° C.

EXAMPLE XV

A mixture of 7.5 parts of 1 - (1,2,3,4,5-tetrahydro-1-naphthyl)-5 - carboxy-imidazole and 80 parts of thionylchloride is stirred and refluxed for 1 hr., 30 mins. The excess thionylchloride is evaporated in vacuo. To the cooled residue are added 25 parts of cyclohexanol and the mixture is heated to 80° C. The mixture is kept for 2 hours and it is then poured onto water. The aqueous phase is alkalized and extracted three times with ether and three times with hydrochloric acid solution 3 N. The aqueous layer is alkalized again and extracted with ether. The extract is dried and there is added 3 parts of nitric acid. The precipitated product is filtered off and recrystallized from a mixture of 2-propanol and diisopropylether, yielding 1-(1,2,3,4-tetrahydro-1-naphthyl) - 5 - (cyclohexyloxy-carbonyl)-imidazole nitrate; M.P. 145–145° C.

EXAMPLE XVI

A mixture of 7.5 parts of 1 - (1,2,3,4-tetrahydro-1-naphthyl)-5-carboxy-imidazole and 80 parts of thionylchloride is stirred and refluxed for 1 hr. 30 mins. The excess thionylchloride is taken off and to the cooled residue is added 50 parts of 2-ethoxy-ethanol. This mixture is stirred and refluxed for 30 minutes. The excess 2-ethoxyethanol is taken off and the residue is poured onto water. This aqueous phase is alkalized and extracted three times with ether. The combined extracts are dried and then there is added 3 parts of nitric acid. The precipitated salt is filtered off and recrystallized from a mixture of 2-propanol and diisopropylether, yielding 1-(1,2,3,4-tetrahydro-1-naphthyl)-5 - (2 - ethoxy-ethoxy-carbonyl)-imidazole nitrate; M.P. 117–118° C.

EXAMPLE XVII

To a mixture of 64 parts of 1-amino-indan and 63 parts of triethylamine in 150 parts of dimethylformamide is added 68 parts of methyl chloroacetate. The whole is heated to 45° C. and stirred for 18 hours. Then there is added 800 parts of ether. The whole is filtered and the filtrate is washed five times with water. The organic phase is dried and evaporated. The oily residue (mainly 1 - [N-(methoxy-carbonyl-methyl)-amino]-indan) is dissolved in 400 parts of xylene. This solution is stirred and refluxed together with 24 parts of formic acid until no more water is separated. Then a second portion of 12 parts of formic acid is added and again stirred and refluxed until no more water is separated. This treatment is repeated with a third portion of 12 parts of formic acid. After cooling, the solution is washed three times with 100 parts formic acid 20%, once with water and once with sodium bicarbonate solution. The organic phase is dried and evaporated in vacuo. To the residue is added 80 parts of diisopropylether, whereupon on standing the product crystallizes. It is filtered off and recrystallized from diisopropylether, yielding 1 - {N-formyl-N-[(methoxy-carbonyl)-methyl]-amino}-indan; M.P. 65–69° C.

A sodium methoxide solution is freshly prepared in the usual manner, starting from 8.4 parts of a sodium-dispersion in benzene (50%) and 20 parts of methanol in 100 parts of tetrahydrofuran. This solution is cooled to 5° C., and there is added dropwise a solution of 39 parts of 1 - {N - formyl-N-[(methoxy-carbonyl)-methyl]-amino}-indan and 30 parts of methyl formate in 50 parts of tetrahydrofuran. The whole is stirred in an ice-bath for 30 minutes. The ice-bath is removed and stirring is continued for 18 hours at room temperature. To the reaction mixture is added successively 200 parts of water and 80 parts of ether. The aqueous phase is separated and there is added successively 30 parts of hydrochloric acid and methanol until all went into solution. Then there is added 20 parts of potassium isothiocyanate in a minimal quantity of water. The whole is stirred at 40° C. until crystallization sets in. The heating-source is removed and the whole is further stirred overnight. The precipitated product is filtered off and recrystallized from a mixture of benzene and hexane and once more from methanol, yielding 1-(1-indanyl) - 2 - mercapto-5-(methoxy-carbonyl)-imidazole; M.P. 158–160.5° C.

To a mixture of 9.8 parts of sodium nitrite in 20 parts of water containing 9.8 parts of nitric acid (d=1.34) are added portionwise 7 parts of 1-(1-indanyl)-2-mercapto-5-(methoxy-carbonyl)-imidazole at a temperature of 45° C. (exothermic reaction). After the addition is complete, the whole is stirred for one hour at room temperature. The reaction mixture is cooled to 5° C. The precipitated product is filtered off. It is dissolved in 100 parts of water. To this solution is added sodium carbonate until pH 9. The product is extracted with ether and there is added, after drying, 2 parts of nitric acid. The precipitated product is filtered off and recrystallized from a mixture of methanol and diisopropylether, yielding 1-(1-indanyl)-5-(methoxy-carbonyl)-imidazole nitrate; M.P. 139.5–140.5° C.

EXAMPLE XVIII

To a solution of 13 parts of 1-(1-indanyl)-5-(methoxy-carbonyl)-imidazole nitrate in 100 parts of warm water is added an excess of sodium carbonate (until pH 10). The free base is extracted with ether. The extract is dried and evaporated. The residue is triturated in petroleumether, filtered off again and dried, yielding 1 - (1-indanyl)-5-(methoxy-carbonyl)-imidazole; M.P. 82–83° C.

EXAMPLE XIX

A mixture of 10 parts of 1-(1-indanyl)-5-(methoxy-carbonyl)-imidazole and 15 parts of sodium hydroxide solution 10 N in 37.5 parts of water is stirred and refluxed for 30 minutes. The reaction mixture is diluted with 40 parts of water and then there is added 22.5 parts of glacial acetic acid. On standing at room temperature, the product is precipitated. It is filtered off and recrystallized twice from water, yielding 1-(1-indanyl)-5-carboxy-imidazole; M.P. 209–211.5° C.

A mixture of 4.5 parts of 1-(1-indanyl)-5-carboxy-imidazole and 80 parts of thionylchloride is stirred and refluxed for 1 hr. 50 mins. The excess thionylchloride is taken off and to the cooled residue is added 40 parts of ethanol. This mixture is stirred and refluxed for 30 minutes. The excess ethanol is taken off and the residue is poured onto 100 parts of water. The aqueous phase is alkalized to pH 10 and the product is extracted with ether. The extract is dried and there is added 2 parts of nitric acid. The precipitated product is filtered off and recrystallized twice: first from a mixture of ethanol and diisopropylether and then from a mixture of acetone and diisopropylether, yielding 1-(1-indanyl)-5-(ethoxy-carbonyl)-imidazole nitrate; M.P. 139–140° C.

EXAMPLE XX

To a series of test-tubes containing 4.5 ml. of a dextrose broth (prepared from 20 g. dextrose, 10 g. neopeptone and 1000 ml. distilled water) is added a 0.5 ml. portion of a solution of 1-(1,2,3,4-tetrahydro-1-naphthyl)-5-(methoxy-carbonyl)imidazole oxalate (A) and 1-(1,2,3,4-tetrahydro-1-naphthyl)-5-(ethoxy-carbonyl) - imidazole nitrate (B), respectively, of appropriate concentrations so that the 5 ml. total volume contains 0.1 $\gamma$/ml., 1 $\gamma$/ml., 10 $\gamma$/ml. or 100 $\gamma$/ml. of (A) or (B), the symbol $\gamma$ representing "micrograms." The broth is then infected with an inoculum composed of a constant volume of a mixture of dermatophyte spores and mycelium. The inoculate consists of a volume cut from a 2–3 week old colony grown on an agar culture medium, which volume has a 4 mm.$^2$ base and a 1–2 mm. height. After 14 days, the following antimycotic data are recorded:

| Dermatophyte | (A) | (B) |
| --- | --- | --- |
| Microsporum canis | ++ | ++ |
| Ctenomyces mentagrophites | ++ | +++ |
| Trichophyton rubrum | ++ | ++++ |
| Ctenomyces interdigitalis | ++ | ++ |
| Epidermophyton floccosum | ++ | +++ |
| Trichophyton tonsurans | ++ | ++ |
| Trichophyton verrucosum | ++ | ++ |

0 = no activity.
+ = activity at 100 $\gamma$/ml.
++ = activity at 10 $\gamma$/ml.
+++ = activity at 1 $\gamma$/ml.
++++ = activity at 0.1 $\gamma$/ml.

EXAMPLE XXI

A dextrose agar culture medium is prepared from 20 g. dextrose, 10 g. neopeptone, 20 g. agar and distilled water to make 1000 ml. A constant volume of this medium is placed into a series of test-tubes (16 mm. diameter; 160 mm. height) and standard slants are prepared in the conventional manner. A constant volume of a dermatophyte colony is introduced onto the center of each slant. The inoculate is prepared as in Example XX. After 11 days in the case of Microsporum canis and 9 days in the case of Ctenomyces mentagrophites, the entire colony grown on the dextrose agar medium is removed, pulverized with quartz and the resulting powder mixed with a constant volume of honey. Half of this honey preparation is then spread over the black of a guinea-pig which has been shaved and scarified (i.e., scratch as if for vaccination) over a surface of 9 cm.$^2$. The next day, the infected area is treated topically with an ointment composed of 1 or 4 percent by weight of 1-(1,2,3,4-tetrahydro-1-naphthyl)-5-(methoxy-carbonyl)-imidazole oxalate (A) and 1-(1,2,3,4 - tetrahydro - 1 - naphthyl - 5 - ethoxy - carbonyl)-imidazole nitrate (B), respectively, admixed with Carbowax 1500. The following data are recorded on the 42nd day after infection:

| Dermatophytes | (A) | (B) |
| --- | --- | --- |
| Ctenomyces mentagrophites | + | ++ |
| Microsporum canis | + | + |

+ = activity at ointment concentration of 4%.
++ = activity at ointment concentration of 1%.

What is claimed is:

1. A member selected from the group consisting of a chemical compound having the formula:

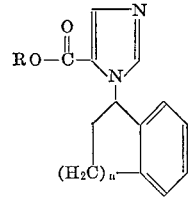

and the therapeutically active acid addition salts thereof, wherein R is a member selected from the group consisting of lower alkyl, allyl, lower alkoxy-lower alkyl, di-(lower alkyl)-amino-lower alkyl, benzyl, cyclopentyl, cyclohexyl and tetrahydrofury-methy; and $n$ is a whoe integer from 1 to 2.

2. A member selected from the group consisting of the compound 1 wherein R is lower alkyl and $n$ is 1, and the therapeutically active acid addition salts thereof.

3. A member selected from the group consisting of the compound of claim 1 wherein R is lower alkyl and $n$ is 2, and the therapeutically active acid addition salts thereof.

References Cited

Godefroi et al.: Jour. Med. Chem., vol. 8, pages 220–3 (1965).

Jones: Jour. Amer. Chem. Soc., vol. 71, pages 644–7 (1949).

NATALIE TROUSOF, Primary Examiner

U.S. Cl. X.R.

260—347.4, 471; 424—273

PO-1050
(5/69)

UNITED STATES PATENT OFFICE
CERTIFICATE OF CORRECTION

Patent No. 3,547,942      Dated December 15, 1970

Inventor(s) E.F. Godefroi & C.A.M. Van Der Eijcken

It is certified that error appears in the above-identified patent and that said Letters Patent are hereby corrected as shown below:

In Column 2, formula IV, "CHOHa" should read --CHONa--. In Column line 29, "carboxylic" is misspelled. In Column 5, line 37, delete "the" and in line 42 add a parenthesis at the beginning of the line and correct the spelling of "mercapto". Same Column, line 48, insert a parenthesis before "methoxy", and in line 52, insert --1-- after tetrahydro. In Column 7, line 70, "excess" is misspelled. In Column line 5, "propanol" is misspelled, in line 23 delete the parenthesis after carbonyl, in line 45 "carboxyl" should read --carboxy--, same in line 62, and line 73 should read --and diisopropylether--, in li 74, "1" should read -- 2 --; in line 75 "113" should read --133--. In Column 9, line 3, "carboxyl" should read --carboxy--, in line 36, delete "5", in line 50, "145" should read --144--. In Column 12, line 2, "black" should read --back--, line 8 insert parenthesis after "naphthyl" and before "ethoxy". In Claim 1, that portion of the formula reading "$(H_2C)_n$" should read --$(CH_2)_n$--. In Claim 1, line 35, "tetrahydrofuryl" is misspelled, "methyl" is misspelled, and "whole" is misspelled. In Claim 2 insert --of claim-- after "compound".

SIGNED AND
SEALED
MAR 16 1971

(SEAL)
Attest:

Edward M. Fletcher, Jr.
Attesting Officer

WILLIAM E. SCHUYLER, JR.
Commissioner of Patents